United States Patent
Le Gonidec

(10) Patent No.: US 8,364,374 B2
(45) Date of Patent: Jan. 29, 2013

(54) METHOD AND A DEVICE FOR CALCULATING A STARTING OR STOP SEQUENCE FOR AN ENGINE

(75) Inventor: Serge Le Gonidec, Vernon (FR)

(73) Assignee: SNECMA, Paris (FR)

( * ) Notice: Subject to any disclaimer, the term of this patent is extended or adjusted under 35 U.S.C. 154(b) by 463 days.

(21) Appl. No.: 12/578,809

(22) Filed: Oct. 14, 2009

(65) Prior Publication Data

US 2010/0094522 A1    Apr. 15, 2010

(30) Foreign Application Priority Data

Oct. 15, 2008    (FR) ...................................... 08 56971

(51) Int. Cl.
*G06F 19/00* (2011.01)
(52) U.S. Cl. .............................. 701/99; 60/245; 60/207
(58) Field of Classification Search .................... 701/99, 701/100; 60/207, 245, 266, 602, 603, 604
See application file for complete search history.

(56) References Cited

U.S. PATENT DOCUMENTS

| | | | |
|---|---|---|---|
| 3,171,250 A | 3/1965 | Machlanski et al. | |
| 4,618,931 A * | 10/1986 | Miller et al. | 701/100 |
| 5,070,691 A * | 12/1991 | Smith et al. | 60/245 |
| 5,148,674 A | 9/1992 | Morris | |
| 5,531,067 A * | 7/1996 | Koppel | 60/259 |
| 5,873,240 A * | 2/1999 | Bussing et al. | 60/207 |
| 6,619,031 B1 | 9/2003 | Balepin | |
| 7,542,885 B1 * | 6/2009 | Majumdar | 703/2 |
| 2002/0023623 A1 * | 2/2002 | Okumura et al. | 123/491 |
| 2004/0050063 A1 * | 3/2004 | Schmotolocha et al. | 60/767 |
| 2004/0159108 A1 * | 8/2004 | Lee | 60/804 |
| 2005/0081508 A1 * | 4/2005 | Edelman et al. | 60/224 |
| 2005/0151107 A1 * | 7/2005 | Shu | 251/214 |
| 2005/0160735 A1 * | 7/2005 | Nelson et al. | 60/670 |
| 2006/0115414 A1 * | 6/2006 | Nelson et al. | 423/658.2 |
| 2008/0000215 A1 * | 1/2008 | Duncan | 60/204 |
| 2008/0053064 A1 * | 3/2008 | Erickson et al. | 60/266 |
| 2008/0203346 A1 * | 8/2008 | Shu | 251/214 |
| 2008/0315142 A1 * | 12/2008 | Faye et al. | 251/209 |
| 2009/0306866 A1 * | 12/2009 | Malikopoulos | 701/59 |

* cited by examiner

*Primary Examiner* — Helal A Algahaim
(74) *Attorney, Agent, or Firm* — Weingarten, Schurgin, Gagnebin & Lebovici LLP

(57) ABSTRACT

The method serves to calculate a start sequence or a stop sequence for an engine, said sequence comprising a plurality of cues at which predetermined actions should be performed in the control of said engine. The method comprises:
a step of obtaining at least one thermodynamic condition of said engine; and
a step of calculating said sequence as a function of: said at least one thermodynamic condition; dimensional parameters of said engine; and criteria for proper operation of said engine.

7 Claims, 3 Drawing Sheets

METHOD AND A DEVICE FOR CALCULATING A STARTING OR STOP SEQUENCE FOR AN ENGINE

BACKGROUND OF THE INVENTION

The present invention lies in the field of controlling an engine. It applies in particular to controlling a rocket engine.

The invention relates more particularly to a method and to a device for optimizing starting or stop sequences of such an engine.

As is known to the person skilled in the art, such sequences define the timing of events such as, for example: opening, adjusting, or closing valves, or igniting pyrotechnic means.

In the present state of the art, the starting and stop sequences of a rocket engine are predetermined once and for all on the ground and they are programmed into an on-board computer.

Consequently, each time a rocket engine needs to be (re) ignited, on launch or after a first flight around the earth, it always executes the same sequence.

Unfortunately, it turns out that the engine does not always respond in the same way to the same sequence, in particular as a result of drift in certain of its structural characteristics (e.g. its heat exchange coefficient), in its environment, or in its thermodynamic conditions.

Precalculated prior art sequences are not always optimal throughout the lifetime of the engine.

OBJECT AND SUMMARY OF THE INVENTION

The present invention solves those drawbacks.

To this end, the invention provides a calculation method for calculating a start sequence or a stop sequence for an engine, said sequence comprising a plurality of cues (or instants) at which predetermined actions should be performed in the control of said engine, the method comprising:
- a step of obtaining at least one thermodynamic condition of said engine; and
- a step of calculating said sequence as a function of: said at least one thermodynamic condition; dimensional parameters of said engine; and criteria for proper operation of said engine.

Thus, in accordance with the invention, the cues for the starting (or stopping) sequence are recalculated immediately after each start (or stop) of the engine as a function of the thermodynamic parameters of the engine.

It is crucial to observe that the invention sets out to calculate or adjust instants (cues) that define the starting or stop sequence, with these calculations being performed prior to the sequence itself being carried out.

The invention does not set out to control the running of the sequence proper, but rather to program how that will take place.

The invention thus makes it possible to optimize such sequences.

In a particular implementation, said thermodynamic conditions of the engine that are taken into account are:
- the initial temperature of the regenerator circuit of said engine (starting);
- a coefficient representative of the heating of said regenerator circuit (starting and stopping); and
- a coefficient representative of the head loss of said regenerator circuit (starting and stopping).

In a particular implementation, calculating a sequence comprises:
- modeling the behavior of said engine by means of a previously-obtained system of regression equations, said model serving to express said criteria for proper operation as a function of said cues, of said dimensional parameters, and of said thermodynamic conditions; and
- a step of solving said system by the method of least squares in order to obtain said cues.

In a particular implementation, the various steps of the optimization method are determined by computer program instructions.

Consequently, the invention also provides a computer program, the program being suitable for being run on a computer on board a rocket, the program including instructions suitable for implementing the steps of a calculation method as specified above.

Similarly, the invention also provides a calculation device for calculating a start sequence or a stop sequence for an engine, said sequence comprising a plurality of cues (or instants) at which predetermined actions need to be taken in the control of said engine, the device comprising:
- means for obtaining at least one thermodynamic condition of said engine; and
- means for calculating said sequence as a function of: said at least one thermodynamic condition; dimensional parameters of said engine; and criteria for proper operation of said engine.

The invention also provides a rocket engine including such a calculation device.

BRIEF DESCRIPTION OF THE DRAWINGS

Other characteristics and advantages of the present invention appear from the following description made with reference to the accompanying drawings that show an embodiment having no limiting character. In the figures.

DETAILED DESCRIPTION OF AN EMBODIMENT

Figure 1:
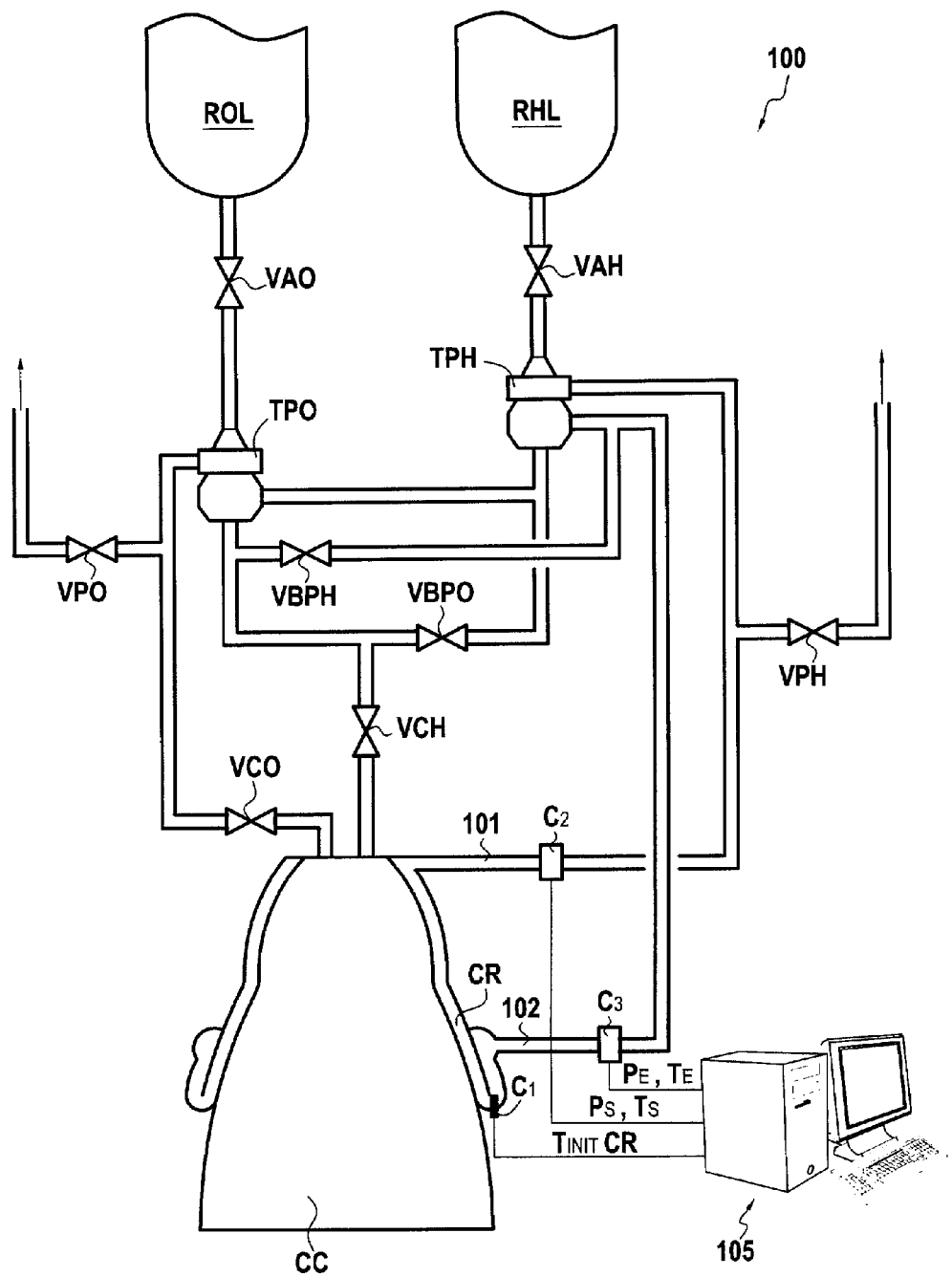
FIG. 1 shows a rocket engine in accordance with the invention in a particular embodiment.

FIG. 1 shows a rocket engine 100 in accordance with the invention. This engine makes use of the cryogenic propellants, liquid oxygen (oxidizer) and liquid hydrogen (fuel), that are stored in respective tanks ROL and RHL, with the flow of each of these propellants taking place through valves VAO and VAH.

In the example described herein, the enthalpy necessary for driving two turbopumps TPO, TPH is delivered to the hydrogen by passing through a regenerator circuit CR constituted by a double wall on the combustion chamber CC. More precisely, liquid hydrogen enters into the regenerator circuit CR by a pipe 101, vaporizes on coming into contact with the walls, and leaves the regenerator circuit CR via a pipe 102 in the form of hydrogen gas for driving the turbopumps TPH and TPO.

Progressive "bypass" hydrogen valves VBPH and VBPO serve to adjust the powers of the turbopumps TPH and TPO by diverting a fraction of the flow of gaseous hydrogen for the purposes of:

adjusting the ratio RM of the mixture of oxygen and hydrogen; and adjusting the pressure PCC in the combustion chamber CC.

The engine 100 has a hydrogen purge valve VPH and an oxygen purge valve VPO. These valves are used during the period of cooling down the engine, during which the liquid propellants are caused to flow solely through the turbopumps TPO and TPH in order to ensure that the engine reaches certain conditions of temperature and pressure.

The chamber valves VCH and VCO enable fuel (hydrogen) and oxidizer (oxygen) selectively to reach the combustion chamber CC. The valve VCO opens in two stages that are spaced apart by $\Delta T\_VCO$.

In the embodiment described here, the method of calculating the starting and stop sequences in accordance with the invention is determined by a computer program run on a computer 105 embedded in the engine 100.

In accordance with the invention, the engine 100 includes means for measuring the initial temperature TinitCR of the regenerator circuit CR.

In the example described here, these measurement means are constituted by a temperature sensor $C_1$ placed in the regenerator circuit CR and coupled to the computer 105.

The engine 100 also has means for measuring coefficients DTCR representative of heating and DPCR representative of head loss in the regenerator circuit CR.

In the embodiment described here, the coefficient DTCR is calculated on the basis of the difference between the temperature $T_S$ measured in the hydrogen outlet pipe 102 and the temperature $T_E$ measured in the hydrogen inlet pipe 101 in the regenerator circuit CR.

In the embodiment described here, the coefficient DPCR is calculated on the basis of the difference between the pressure $P_s$ measured in the hydrogen outlet pipe 102 and the pressure $P_E$ in the hydrogen inlet pipe 101 in the regenerator circuit CR.

In the embodiment described here, these pressure and temperature measurements are performed by sensors $C_2$, $C_3$ placed in the pipes 101 and 102 and coupled to the computer 105.

Figure 2:
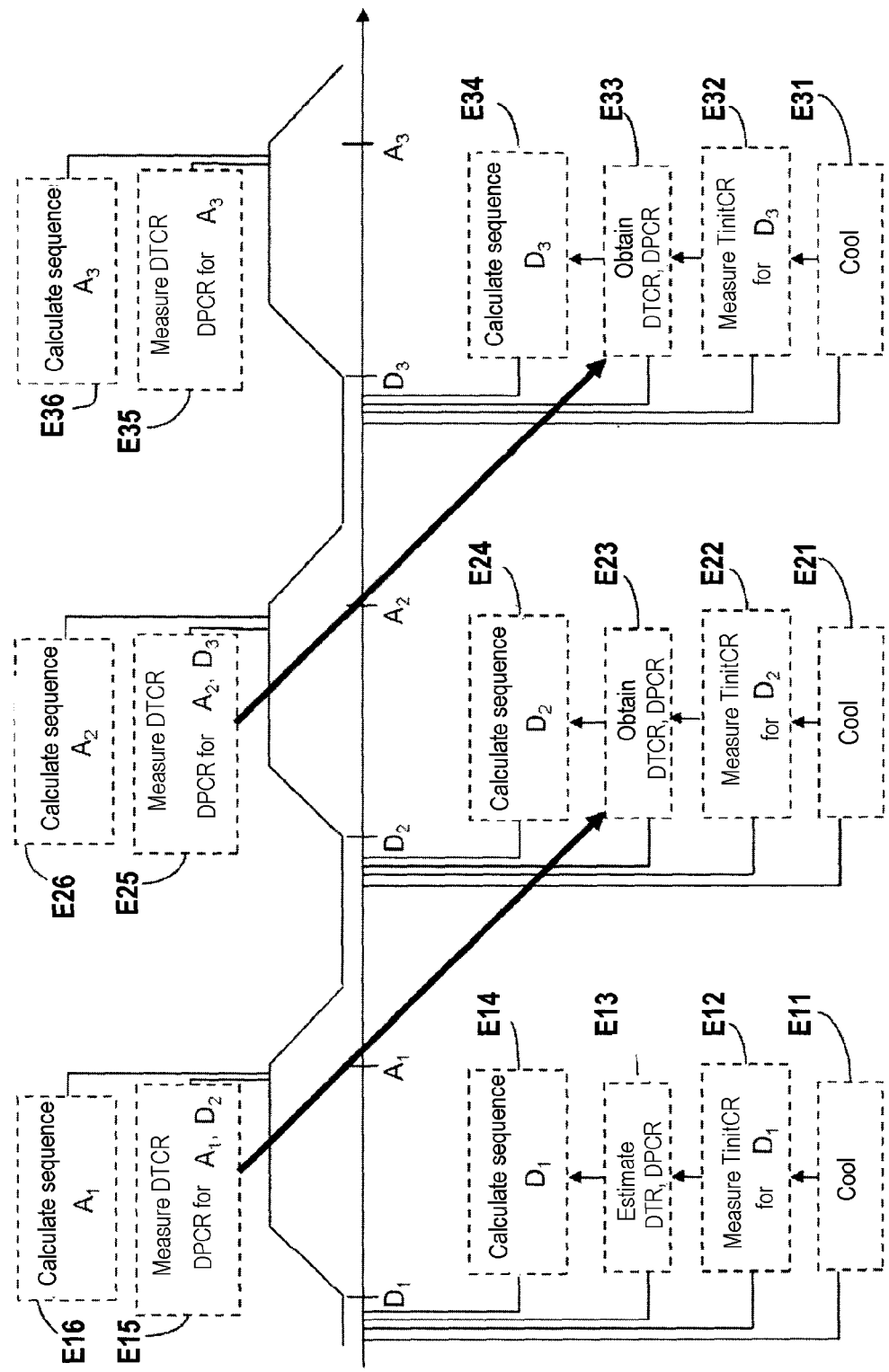
FIG. 2 is a diagram showing a method of calculating a starting and stop sequence for the FIG. 1 engine in accordance with a particular implementation of the invention.

FIG. 2 is a diagram showing how the engine 100 operates with the calculation steps of FIG. 1.

In this example, it is assumed that the engine 100 performs three start sequences $D_1$ to $D_3$ and three stop sequences $A_1$ to $A_3$.

In accordance with the invention, prior to each starting or stop sequence $D_i$ or $A_i$, the cues for the sequences are calculated by taking account of the thermodynamic conditions of the engine 100.

More precisely:
the cues for the first start sequence $D_1$ are calculated during a step E14.
the cues for the first stop sequence $A_1$ are calculated during a step E16;
the cues for the second start sequence $D_2$ are calculated during a step E24;
the cues for the second stop sequence $A_2$ are calculated during a step E26;
the cues for the third start sequence $D_3$ are calculated during a step E34; and
the cues for the third stop sequence $A_3$ are calculated during a step E36.

A) Start Sequences

There follows a detailed description of an implementation of the invention for optimizing a start sequence $D_1$, $D_3$.

1/ Thermodynamic Conditions on Starting

In the implementation described here, the thermodynamic conditions taken into account for calculating the cues for the start sequences $D_i$ are as follows:
the initial temperature TinitCR of the regenerator circuit CR; and
the coefficients DTCR representative of the heating and DPCR representative of the head loss of the regenerator circuit CR.

In the embodiment described here, the initial temperature TinitCR of the regenerator circuit CR is measured before each start, at the end of cooling down.

Thus, by way of example, the start sequence $A_1$ is calculated (step E14) after measuring (step E12) the temperature TinitCR of the regenerator circuit CR, at the end of cooling (step E11).

In the embodiment of the invention, the coefficients DTCR representative of the heating and DPCR representative of the head loss of the regenerator circuit CR are estimated (step E13) before the first start sequence $D_1$ (step E14), and they are measured (steps E15, E25) during the pauses preceding each of the restart sequences $D_2$, $D_3$ (steps E24, E34).

2/ Adjusting the Starting Cues

In the example described here, the cues $T_0$ to $T_{12}$ for a start sequence $D_i$ are as follows:

| Cue | Instant | Action |
|---|---|---|
| $T_0$ | H0 − AD | Calculate the start sequence |
| $T_1$ | CUE_VPO_Open | Open the valve VPO |
| $T_2$ | CUE_VPH_Open | Open the valve VPH |
| $T_3$ | CUE_VAO_Open | Open the valve cooling valve VAO |
| $T_4$ | CUE_VAH_Open | Open the cooling valve VAH |
| $T_5$ | CUE_VBPH_Close | Close the valve VBPH towards the abutment adjustment position |
| $T_6$ | CUE_VBPO_Close | Close the valve VBPO towards the abutment adjustment position |
| $T_7$ | H0 | Open VCH leading to the engine 100 starting |
| $T_8$ | CUE_IGN | Operate ignitor |
| $T_9$ | CUE_VCO | First opening of VCO |
| $T_{10}$ | CUE_VCO + $\Delta T\_VCO$ | Second opening of VCO |
| $T_{11}$ | CUE_VPH_Close | Close VPH |
| $T_{12}$ | CUE_VPO_Close | Close VPO |

In practice, the duration AD (to be determined) between calculating the start sequence and the opening sequence of VCH is of the order of a few hundreds of milliseconds.

In the implementation described here, the invention makes it possible to optimize the start sequence of the engine by adjusting the cues $T_0$ to $T_{12}$ as a function of:
the thermodynamic conditions of the engine;
the dimensional parameters of the engine; and
criteria for proper operation of the engine.

The column vector of the cues for adjusting the start sequence is written $X_{start}$:

$$X_{start} = {}^t(CUE\_VOP\_Open, CUE\_VPH\_Open, CUE\_VAO\_Open, CUE\_VAH\_Open, CUE\_VBPH\_Close, CUE\_VBPO\_Close, CUE\_ALL, CUE\_VCO, CUE\_VPH\_Close, CUE\_VPO\_Close, AT\_VCO)$$

3/ Dimensional Parameters of the Engine

In the example described here, the dimensional parameters of the engine that are taken into account on starting are as follows:
the sections KS_VPH and KS_VPO of the purge valve VPH and VPO;

the durations TM_VBPH and TM_VBPO for which the bypass valves VBPH and VBPO are open;

the durations TM_VPH and TM_VPO for which the purge valves VPH and VPO are open; and the duration TM_VCO for which the valve VCO is open.

The column vector of these dimensional parameters is written $P_{start}$:

$$P_{start} = {}^t(KS\_VPH, KS\_VPO, TM\_VBPH, TM\_VBPO, TM\_VPH, TM\_VPO, TM\_VCO)$$

4/ Criteria for Proper Operation of the Engine

In the implementation described here, the criteria for proper operation of the engine that need to be complied with on starting are written $y_1, \ldots, y_N$ and are in particular criteria relating to the following:

the amplitude DeltaRTH of the speed reversal of the hydrogen turbopump TPH;

the speed of rotation and the acceleration of the hydrogen turbopump TPH;

the speed of rotation and the acceleration of the oxygen turbopump TPO;

the ratio RM of the hydrogen/oxygen mixture; and the difference between said ratio RM and determined acceptable limits for said ratio.

The column vector of these criteria $y_i$ for proper operation is written $Y_{start}$.

$$Y_{start} = {}^t(y_1, \ldots, y_N)$$

5/ Calculating the Starting Cues

The way the starting cues are calculated in the invention makes it possible to calculate effectively the values $X_{start}$ (or $X_{stop}$) for the next sequence, before it takes place.

a/ First Variant Implementation

In a first variant implementation of the invention, the behavior of the engine is modelled by a system S of equations.

The model S is previously obtained on the basis of an experimental plan, enabling the criteria $Y_{start}$ for proper operation of the engine on starting to be expressed as a function of:

the adjustment cues $X_{start}$ for the starting period;

the dimensional parameters $P_{start}$ of the engine on starting; and the thermodynamic conditions of the engine TinitCR, DTCR, and DPCR.

$$Y_{start} = S(X_{start}, P_{start}, TinitCR, DTCR, DPCR)$$

By way of example, the proper operation criterion DeltaRTH (velocity inversion amplitude of TPH) may be expressed in the following form:

$$DeltaRTH = y_1 = \Sigma \alpha_{1,i} x_i$$

where $x_i$ is a coordinate of $X_{start}$

In this implementation, the system S of equations is expressed in a linear form relative to the adjustment cues $X_{start}$:

$$Y_{start} = A.X_{start} + G(P_{start}, TinitCR, DTCR, DPCR)$$

in which:

A is a sensitivity matrix $[a_{i,j}]$ associated with the starting cues $X_{start}$; and G is a sensitivity matrix $[g_{i,j}]$ associated with the thermodynamic conditions of the engine, independent of $X_{start}$.

This operation is known to the person skilled in the art and is not described in detail. It can be achieved in particular by:

resolving S into two functions H and G that are respectively dependent and independent of the cues $X_{start}$; and linearizing the function H relative to $X_{start}$.

$$Y_{start} = H + G = A.X_{start} + G$$

In a particular implementation, in order to improve the conditioning of the matrix A, the regression system is normalized by the initial vector $Y_0$ of the criteria for good operation, and attempts are made to solve:

$$Y1_{start} = A1.X_{start} + G1$$

where:

$Y1_{start} = Y_{start}/Y_O$, $X1_{start} = X_{start}/Y_O$, $G1 = G/Y_O$

Thereafter, in the implementation described here, the least squares method is used to obtain the vector $X1_{start}$ and the vector $X_{start}$ of the start sequence adjustment cues is deduced therefrom.

The least squares method consists in minimizing the distance between:

$(Y1_{start} - G1)$ and $A1.X_{start}$, i.e. $\min \|A1.X_{start} - (Y1_{start} - G1)\|$ In a particular implementation, a weighting vector $\lambda$ is used that is appropriately selected to weight the starting and stopping criteria as a function of their levels of criticality.

b/ Second Variant Implementation

Figure 3:
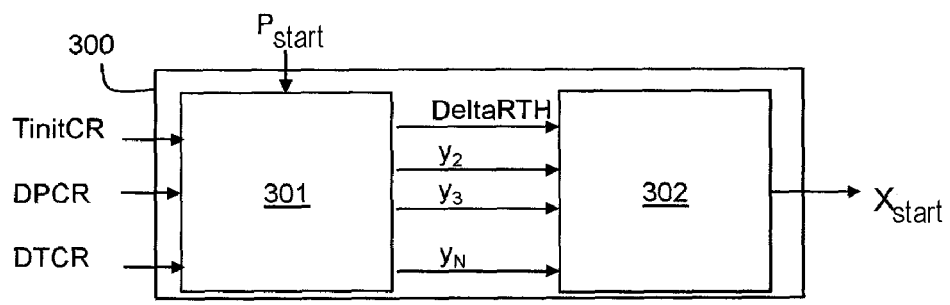
FIG. 3 shows a calculation device suitable for use in a variant of the invention.

In a second variant implementation, a start sequence $D_i$ is calculated within a calculation device 300 shown diagrammatically in FIG. 3.

In an embodiment using this second variant, the calculation device 300 comprises:

a prediction module 301 suitable for predicting the proper operation criteria $Y_{start}$ as a function of the thermodynamic parameters TintCR, DPCR, DTCR and of the dimensional parameters $P_{start}$ of the engine that are taken into account on starting; and a fuzzy logic system 302 suitable for determining the cue vector $X_{start}$ as a function of criteria $Y_{start}$ determined by the prediction module 301.

The prediction module 301 may be a fuzzy logic module.

In a variant, the module is deterministic and is suitable for solving the system of linear equations of matrix $A^{-1}$, where A is the above-described sensitivity matrix associated with the starting cues.

B) Stop Sequence

The method of adjusting cues for a stop sequence $A_i$ is identical to that described above for adjusting the cues for a start sequence, and there is no need to describe the details thereof.

1/ Thermodynamic Conditions on Stopping

In the embodiment described here, the thermodynamic conditions taken into account for calculating the stop sequence cues $A_i$ are the heating coefficients DTCR and the head loss coefficients DPCR of the regenerator circuit CR.

In an implementation of the invention, the heating coefficient DTCR and the head loss circuit coefficient DPCR of the regenerator circuit CR are measured (steps E15, E25, E35) before each stop sequence $A_1$, $A_2$, $A_3$ (steps E16, E26, E36).

2/ Adjusting the Stopping Cues

In the implementation described here, the cues $T_0$ to $T_7$ for a stop sequence $A_i$ expressed relative to the cue $T_1$ for opening the hydrogen bypass valve VBPH are as follows:

| Cue | Instant | Action |
| --- | --- | --- |
| $T_0$ | $CUE\_VBPO_A$ | Open the valve VBPO. |
| $T_1$ | 0s | Open the valve VBPH. |
| $T_2$ | $CUE\_VPO_A$ | Open VPO |

-continued

| Cue | Instant | Action |
|---|---|---|
| $T_3$ | $CUE\_VPH_A$ | Open VPH |
| $T_4$ | $CUE\_VCO_A$ | Close VCO |
| $T_5$ | $CUE\_VCH_A$ | Close VCH |

The column vector of the adjustment cues for the stop sequence is written $X_{stop}$:

$$X_{stop} = {}^t(CUE\_VBPO_A, CUE\_VPO_A, CUE\_VPH_A, CUE\_VCO_A, CUE\_VCH_A).$$

3/ Dimensional Parameters of the Engine

In the implementation described here, the dimensional parameters of the engine that are taken into account on stopping $P_{stop}$ are the same as those taken into account on starting ($P_{start}$).

4/ Proper Operation Criteria

In the implementation described here, the proper operation criteria of the engine that are taken into account on stopping $Y_{stop}$ are the same as those taken into account on starting ($Y_{start}$).

In a variant, these criteria could be different.

5/ Optimizing the Cues

This optimization may be performed using one or other of the variants described above, i.e. the least squares method, or by means of the fuzzy logic calculation device 300.

Figure 4:
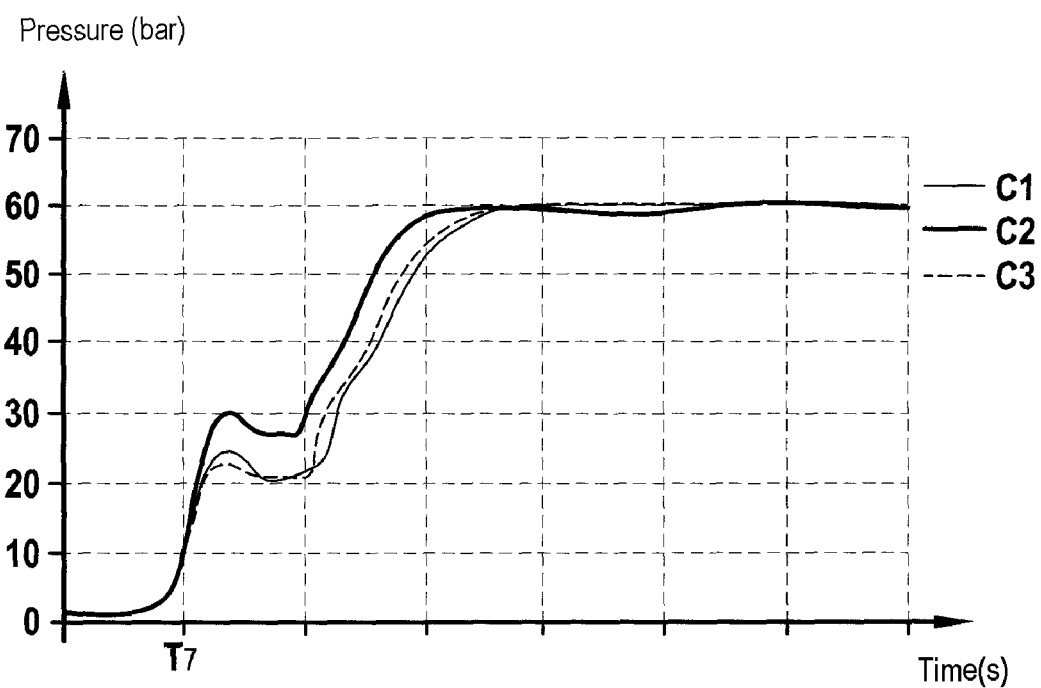
FIG. 4 shows the performance of the invention.

FIG. 4 shows the performance of the invention.

In this figure, curve C1 is a reference curve showing how the pressure PCC in the combustion chamber CC of the FIG. 1 engine varies under nominal conditions, namely, in this example, for an initial temperature TinitCR of the regenerator circuit CR equal to 265 K.

The curves C2 and C3 show how the pressure PCC in the same combustion chamber varies for an initial temperature TinitCR of 200 K, respectively:

without implementing the invention (sequences that are predetermined and independent of thermodynamic conditions); and when implementing the invention (sequences calculated with thermodynamic conditions taken into account).

This figure shows that, by virtue of the invention, the variation of the pressure PCC in the combustion chamber conserves a profile that is very close to the reference model (curve C1) established for nominal conditions, so the invention enables the rocket engine to maintain optimum behavior throughout its life, independently of the thermodynamic conditions of its environment.

What is claimed is:

1. A calculation method for calculating a start sequence or a stop sequence for an engine, said start sequence or said stop sequence comprising a plurality of cues at which predetermined actions should be performed in the control of said engine, wherein the method comprises the steps of:
   obtaining, by a computer associated with said engine, at least one thermodynamic condition of said engine; and
   recalculating, by said computer after at least one start or stop of said engine, said start sequence or said stop sequence as a function of:
      said at least one thermodynamic condition;
      dimensional parameters of said engine; and
      criteria for proper operation of said engine,
   wherein said at least one thermodynamic condition of the engine that is taken into account for recalculating said start sequence by said computer includes:
      the initial temperature of a regenerator circuit of said engine;
      a coefficient representative of heating of said regenerator circuit; and
      a coefficient representative of head loss of said regenerator circuit.

2. The calculation method according to claim 1, wherein said at least one thermodynamic condition of the engine taken into account for recalculating said stop sequence by said computer includes:
   a coefficient representative of heating of a regenerator circuit; and
   a coefficient representative of head loss of said regenerator circuit.

3. The calculation method according to claim 1, wherein said recalculating of said start sequence or said stop sequence comprises:
   modeling, by said computer, a behavior of said engine using a predetermined system of regression equations, said model serving to express said criteria for proper operation as a function of said cues, of said dimensional parameters, and of said at least one thermodynamic condition; and
   solving, by said computer, said predetermined system of regression equations by a method of least squares in order to obtain said cues.

4. A non-transitory computer-readable storage medium including computer-executable instructions for executing the steps of:
   obtaining at least one thermodynamic condition of said engine; and
   recalculating, after at least one start or stop of said engine, said start sequence or said stop sequence as a function of:
      said at least one thermodynamic condition;
      dimensional parameters of said engine; and
      criteria for proper operation of said engine,
   wherein said at least one thermodynamic condition of the engine that is taken into account for recalculating said start sequence includes:
      the initial temperature of a regenerator circuit of said engine;
      a coefficient representative of heating of said regenerator circuit; and
      a coefficient representative of head loss of said regenerator circuit.

5. A calculation device for calculating a start sequence or a stop sequence for an engine, said start sequence or said stop sequence comprising a plurality of cues at which predetermined actions need to be taken in the control of said engine, wherein the device comprises:
   a first computerized component for obtaining at least one thermodynamic condition of said engine; and
   a second computerized component for recalculating, after at least one start or stop of said engine, said start sequence or said stop sequence as a function of:
      said at least one thermodynamic condition;
      dimensional parameters of said engine; and
      criteria for proper operation of said engine,
   wherein said at least one thermodynamic condition of the engine that is taken into account for recalculating said start sequence includes;
      the initial temperature of a regenerator circuit of said engine;
      a coefficient representative of heating of said regenerator circuit; and
      a coefficient representative of head loss of said regenerator circuit.

6. The calculation device according to claim 5, wherein said second computerized component for recalculating said start sequence or said stop sequence comprises:
- a computerized prediction module suitable for predicting the proper operation critical as a function of the thermodynamic parameters and the dimensional parameters of the engine; and
- a fuzzy logic system suitable for determining the cue vector as a function of the criteria determined by the computerized prediction module.

7. A rocket engine including calculation device for calculating a start sequence or a stop sequence for and engine, said start sequence or said stop sequence comprising a plurality of does at which predetermined actions need to be taken in the control of said engine, wherein the device comprises:
- a first computerized component for obtaining at least one thermodynamic condition of said engine; and
- a second computerized component for recalculating, after at least one start or stop of said engine, said start sequence or said stop sequence as a function of:
  - said at least one thermodynamic condition;
  - dimensional parameters of said engine; and
  - criteria for proper operation of said engine, wherein said at least one thermodynamic condition of the engine that is taken into account for recalculating said start sequence includes:
- the initial temperature of a regenerator circuit of said engine;
- a coefficient representative of heating of said regenerator circuit; and
- a coefficient representative of head loss of said regenerator circuit.

* * * * *

UNITED STATES PATENT AND TRADEMARK OFFICE
CERTIFICATE OF CORRECTION

| | |
|---|---|
| PATENT NO. | : 8,364,374 B2 |
| APPLICATION NO. | : 12/578809 |
| DATED | : January 29, 2013 |
| INVENTOR(S) | : Serge Le Gonidec |

It is certified that error appears in the above-identified patent and that said Letters Patent is hereby corrected as shown below:

In the Claims:

Column 9, claim 7, line 11, reads "including calculation" should read --including a calculation--;

Column 9, claim 7, line 12, reads "and" should read --an--; and

Column 9, claim 7, line 14, reads "does" should read --cues--.

Signed and Sealed this
Twenty-seventh Day of August, 2013

Teresa Stanek Rea
*Acting Director of the United States Patent and Trademark Office*